United States Patent [19]
Ayers et al.

[11] Patent Number: 5,298,160
[45] Date of Patent: Mar. 29, 1994

[54] FILTER HOUSING WITH MEANS TO PROHIBIT FLUID FLOW

[75] Inventors: William R. Ayers; Jerald R. Rexroad, both of Bement, Ill.

[73] Assignee: Central Illinois Manufacturing Co., Bement, Ill.

[21] Appl. No.: 807,077

[22] Filed: Dec. 13, 1991

[51] Int. Cl.⁵ .............................................. B01D 27/08
[52] U.S. Cl. .................................. 210/232; 210/248; 210/440; 210/444; 210/447; 210/457
[58] Field of Search ............... 210/232, 248, 440, 443, 210/444, 446, 447, 457, 497.01, 282

[56] References Cited

U.S. PATENT DOCUMENTS

| | | |
|---|---|---|
| 1,616,577 | 2/1927 | Janette . |
| 1,647,799 | 11/1927 | Hammer . |
| 2,529,167 | 11/1950 | Lewis et al. . |
| 2,554,748 | 5/1951 | Lewis et al. ........................ 210/248 |
| 2,702,636 | 2/1955 | Brown . |
| 3,241,679 | 3/1966 | Walter . |
| 3,502,220 | 3/1970 | Kohlberg . |
| 3,850,802 | 11/1974 | Berger . |
| 4,051,042 | 9/1977 | Tullier et al. . |
| 4,609,459 | 9/1986 | Hendrix . |
| 4,693,820 | 9/1987 | Baxter . |
| 4,913,813 | 4/1990 | Covarrubias et al. . |
| 4,929,356 | 5/1990 | Todd . |

Primary Examiner—Robert A. Dawson
Assistant Examiner—W. L. Walker
Attorney, Agent, or Firm—Wood, Phillips, VanSanten, Hoffman & Ertel

[57] ABSTRACT

A filtration system 10 for use to separate contamination from a liquid is provided, including an elongated tubular housing 14 which has a closed end 16 and an open end 18. Located within the housing 14 is an elongated perforated tubular member 20 which has openings 22. A separating baffle 24 for prohibiting flow between the housing 14 and the tubular member 20 is located near the closed end 16 of housing 14. A first fluid port 39 in the housing 32 is located between the filter element 12 and the open end 18. A second port 32 is located in the housing 14 between the filter element 12 and the closed end 16. The filter element 14 is installed and removed through the open end 16 of the housing 14 and is installed between the housing 14 and the member 20. A cover 66 is placed over the open end 16 of the housing 14 in order that fluid which is contained within the housing 14 may be sealed therein. A reservoir 50 is located at the open end 16 of the housing 14 in order that fluid escaping from the housing 14 during removal of the filter element 12 may be contained within the reservoir 50.

20 Claims, 1 Drawing Sheet

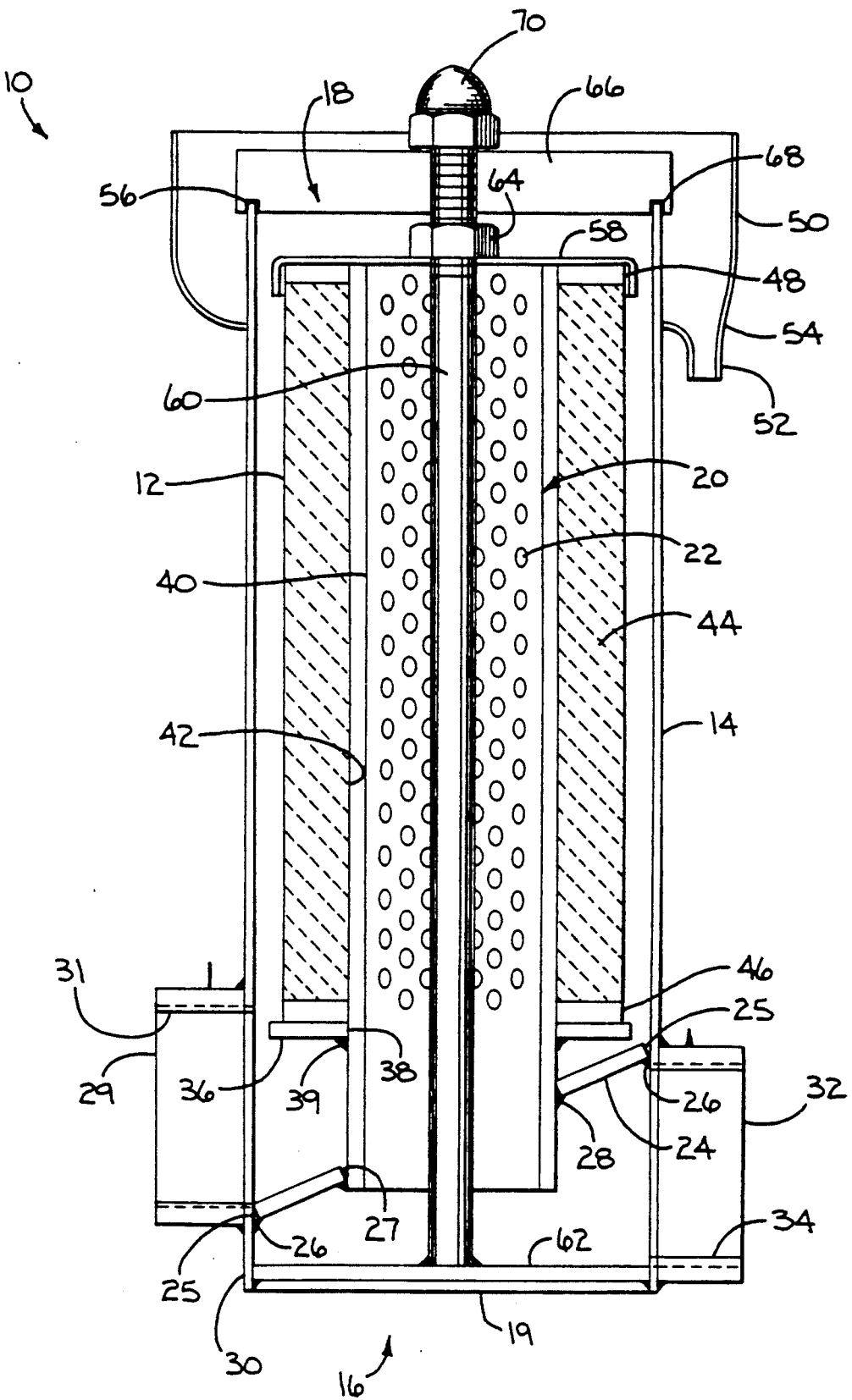

FILTER HOUSING WITH MEANS TO PROHIBIT FLUID FLOW

FIELD OF THE INVENTION

The present invention is directed toward filters, and more particularly toward an inline cartridge filter system for petroleum distillants which utilize a replacement filter without a center support tube.

BACKGROUND OF THE INVENTION

The removal of contamination from fluids which are being pumped through duct work is essential to avoid clogging of the pipes by the contamination and more importantly to avoid damage to pump components. Further, the fluid if it be a petroleum distillant needs to be purified in order that it may adequately serve as a lubricant or as a fuel.

Filters typically have an element to which the contaminants adhere or are trapped. These elements are housed in an enclosure which is sealed and through which the liquid flows. The filter element as it becomes increasingly saturated with contaminants becomes impervious for the fluid flow. Filters must therefore be periodically cleaned or replaced.

Early filters were typically removed, cleaned and replaced. Filters of this type are also known as strainers and are shown in U.S. Pat. No. 1,616,577 to J. T. Janette and U.S. Pat. No. 1,647,799 to F. L. Hammer.

Modern filters are typically removed, discarded and replaced with a new filter. These filters, also known as cartridge type filters, are much more convenient in that they do not require cleaning of a replaceable filter and greatly reduce the filter change time in that the filter need not be cleaned and coincidentally decrease the amount of time that the oil filtration system is inoperable.

These cartridge type filters typically consist of a cylindrically shaped filtering structure supporting a filter media that is composed mostly of a paper substance that is folded accordion style. The filter is typically cylindrical in shape with a cylindrical hole centrally located in the filter. A central perforated tube made of a durable material such as metal or plastic serves to provide support to the filter and also to provide a means for which the fluid may progress from or progress to during the filtration process. An upper and lower cover are affixed to the ends of the filter and are connected to the perforated tube in order to provide sufficient support to and confine the filter media.

Many fluids which are filtered, such as petroleum distillants, pose various ecological problems to the environment and as such their disposal must be appropriately administered.

Typically the petroleum distillant fluid must be separated from the contaminated filter. The presence of the durable perforated center tube makes the removal of the fluid from the filter more difficult. A large expensive press must be used to compress the filter. While the paper element is manufactured from a renewable resource, namely trees, the perforated tube is made from a nonrenewable resource, namely plastic or metals. The existence of a disposable durable perforated tube created therefore further ecological problems.

During removal of the filter element contaminated fluids may spill from the housing containing the fluid and contaminate the area. The spilling is aggravated by the vacuum that can be created between the filter and the filter housing as the filter is lifted upward in a vertical direction the added fluid therefore spills over the outer edges of the housing.

The present invention is directed toward overcoming one or more of the problems discussed above.

SUMMARY OF THE INVENTION

In one aspect of the present invention, a filtration system for use to separate contamination from a liquid is provided, including an elongated tubular housing which has a closed end and an open end. Located within the housing is an elongated perforated tubular member which has a lower opening. A separating means for prohibiting flow between the housing and the tubular member is located near the closed end of the housing. A fluid inlet opening in the housing is located between the separating means and the open end. A fluid outlet opening is located in the housing between the separating means and the closed end. A filter element having an open center is installed on the tubular member and removed through the open end of the elongate housing and is installed between the housing and the member. A cover is placed over the open end of the housing in order that fluid which is contained within the housing may be sealed. A reservoir is located at the open end of the housing in order that fluid escaping from the housing during filter removal may be contained within the reservoir.

In a preferred embodiment of this aspect the fluid inlet opening and the fluid outlet opening are so placed as to be substantially collinear.

In another preferred embodiment the filter element comprises a hollow cylindrical accordion-shaped paper filter media which is contained at one end by a lower cap and at the second by an upper cap. In that the cylindrical perforated tube is a portion of the housing no such perforated tube needs to be a portion of the filter element.

In a second aspect of the invention a cylindrical replaceable element filtration system is used to separate contamination from a fluid. The filtration system includes an elongate tubular housing which has a closed end and an open end. Centrally located within the housing is an elongate perforated center tube. A canted oval-shaped plate is located between the housing and the tube in order that flow between the housing and the tube may be blocked. A tubular inlet opening is located in the housing between the canted plate and the open end. A tubular outlet opening is located in the housing between the canted plate and the closed end. A cylindrical filter element is installed into and removed from the housing through the open end of the housing. The filter element is cylindrically shaped and on one end has a opening in order that the filter element may slide over the elongated perforated center tube. A cover is located on the open end of the housing in order that fluid may be contained within the housing and in order that the fluid is sealed from the environment. A cup-shaped reservoir is located outside the rim of the open end of the housing in order that liquid which may escape from the housing when the contaminated filter element is removed from the housing. The excess liquid spilling over the outer edge of the housing will fall harmlessly into the reservoir.

In a preferred embodiment the filter element comprises a hollow cylindrical paper filter media in an accordion-shaped contained at one end by a lower cap and at the second end by an upper cap. The lower cap has a hole into which the elongate perforated center tube may fit.

In a second preferred embodiment of this aspect the reservoir contains a pipe-fitting and drain line through which liquid collecting in the reservoir may be transferred to a proper receptacle.

In another preferred embodiment of this aspect the filter is secured by a retainer fitting over the filter on the open end of the housing and the retainer is secured by a nut and a threaded stud which is adhered to the housing at the closed end of the housing.

In a third facet of this invention a cylindrical replacement element filtration system is used to separate contamination from a fluid. The filtration system includes an elongate tubular housing with a closed end and an open end. The elongate perforated center tube is centrally located within the housing. A canted oval shaped plate is located between the housing and the tube in order that flow may be blocked between the housing and the tube. A first tubular opening is located in the housing between the canted tube and the open end. A second tubular opening is located in the housing between the canted plate and the closed end. A filter element is located between the housing and the member. A stop is located within the housing to axially locate the filter assembly. A retainer is fitted over the filter element on the open end of the housing in order that the area within the filter element is sealed. A cover is located on the open end of the housing in order that the fluid may be contained within the housing.

In a preferred embodiment of this aspect of the invention the retainer is secured by a nut and a threaded stud extending from the closed end of the housing.

In another preferred embodiment of this aspect of the invention the first and second openings of the filter are substantially co-linear.

In a further preferred embodiment of this aspect of the invention the canted oval shaped plate is welded to the center tube and to the housing cylinder and the stop is a circular plate which is welded to the center tube.

In a fourth aspect of this invention a cylindrical replaceable element filtration system is used to separate contamination from a liquid. The filtration system includes an elongate tubular housing which has an open end and a closed end. An elongated perforate center tube is centrally located within the housing. A canted oval-shaped plate is located between the housing and the tube in order that flow between the housing and the tube may be blocked. A tubular inlet opening in the housing is located between the canted plate and the open end of the housing. A tubular outlet opening in the housing is located between the canted plate and the closed end of the housing. A filter element may be removed or installed from the housing through the open end of the housing. The filter element is located between the housing and the center tube. The filter element has a central opening on one end in order to receive the center tube. The filter element is comprised of accordion folded paper which is contained at one end by a lower cap which also has an opening in order to receive the center tube and at the second end by an upper cap. A stop is welded to the center tube near the closed end of the housing in order to actually locate the filter element.

A cup-shaped reservoir is located at the open end of the housing in order that liquid which may escape from the housing when the filer is removed may be contained. The reservoir has an outlet at the bottom of the reservoir to provide drainage for the reservoir. A retainer is located on the open end of the housing resting on the upper cap of the filter element in order that the liquid inside the filter may be sealed from the liquid outside the filter in order that fluid flow is forced through the filter. The retainer is secured by a nut and a threaded stud which extends from the closed end of the housing in order that the filter be secured in the housing and in order that access to the filter may be provided. A cover is located on the open end of the housing above the retainer and rests upon the outer rim of the housing. The cover is used to seal the fluid from the environment in order to contain the fluid under pressure.

In a preferred embodiment of this aspect the inlet opening and the outlet opening are substantially collinear.

In another preferred embodiment the canted oval-shaped plate is welded to the center tube and to the housing cylinder and the stop is a circular plate which is welded to the center tube.

BRIEF DESCRIPTION OF THE FIGURE

The figure is a cross-sectional view illustrating the filtration system of the present invention.

DETAILED DESCRIPTION OF THE PREFERRED EMBODIMENT

An exemplary embodiment of a filtration system including a cylindrical replacement filter element 12 of the present invention is generally shown in the figure.

The filtration system 10 includes an elongate cylindrical housing 14 having a closed end 16 and an open end 18. The cylindrical housing 14 is made of a durable material preferably metal. The closed end 16 consists of a circular metal plate 19 which is welded to the housing 14. An elongate perforated center tube 20 is centrally located within the housing 14. The center tube 20 is also made of a durable material, preferably metal. The center tube 20 has numerous apertures in the upper $\frac{3}{4}$ of its periphery through which the fluid may pass.

A canted oval-shaped washer-like plate 24 is located between the housing 14 and the central tube 20 near the closed end 16 of the housing 14 and has its periphery 25 sealed by a weld 26 to the housing 14 and its central opening 27 sealed by a weld to the lower end of the center tube 20 whereby flow between the ends 16 and 18 of the housing 14 and the tube 20 is blocked. The canted oval-shaped plate 24 is made of a durable material such as metal and as it is welded at its inside opening 27 to the center tube 20 and its outside periphery 25 to the housing 14, it provides support for the center tube 20 within the housing 14.

A first port 29 is located on an outer cylindrical wall 30 of the housing 14 between the canted plate 24 and the open end 18. The first port 29 is preferably located as close as possible to the canted plate 24. The first port 29 consists of a short cylindrical member made of a durable material such as metal and is welded to the outer wall 30. The first port 29 has internal threads 31 to which standard external pipe threads not shown may mate. Other suitable plumbing connections may perform equally as well.

A second tubular port 32 is located at the outer wall 28 of the housing cylinder 32 between the canted plate 24 and the closed end 16 of the housing 14. The second port 32 is made of a durable material such as metal and is welded to the outer wall 30 of the housing 14. The second port 32 has internal threads 34 which matingly fit with external threads not shown. Other suitable pipe connecting means may perform as well.

A circular plate 36 made of a durable material such as metal and having a centrally located hole 38 is affixed permanently by a weld 39 to the outer wall 40 of the center tube 20 near the closed end 16 of the housing 14. The circular plate 36 is located below or toward the closed end 16 of the housing 14 of the apertures 22 of the center tube 20.

The filter element 12 is located between the housing 14 and the center tube 20. The filter element 12 has an opening 42 on one end of the element 12 by which the filter element is mounted on the center tube 20. The filter element 12 is comprised of a hollow cylindrical filter media 44, typically consisting of a paper element folded accordion style. In order to obtain sufficient vertical compressive strength for the filter element 12 to be properly sealed, reinforcing material may need to be incorporated into the filter media 44. The filter media 44 is contained at the open end 42 by a lower cap 46 and the opposite end by an upper cap 48.

A cup-shaped reservoir 50 is located at the open end 18 of the housing 14 in order that liquid escaping from the housing 14 during the installation and removal of the filter element 12 may be contained. The reservoir 50 is made of a durable material such as metal and is permanently affixed to the outer wall 28 of the housing 14 in order to close and seal the reservoir 50 about the housing 14. The reservoir 50 has an outlet 52 at a bottom 54 of the reservoir 50 in order to provide drainage for the reservoir 50.

The reservoir 50 is constructed with sufficient size in order that the contaminated fluid that rises with the filter element 12 during filter change will cascade over the upper rim 56 of the outer wall 28 of the housing 14 and into the reservoir 50 and not return into the filtration system 10. The outlet 52 is of sufficient size to prevent the liquid leaving the housing 14 during filter element 12 removal to freely drain from the reservoir 50 and not to backflow into the housing 14. A container may be located under the outlet 52 to collect the spilled fluid. Alternatively a drain hose leading to any suitable container may be connected to the outlet 52.

A retainer 58 fits over the closed end of the filter element 12 and is used to seal the liquid located in the inside of the filter element 12 from the liquid located between the filter element 12 and the housing 14. That is, the retainer acts to close the open upper end of the central tube 20. The retainer 58 is secured to the housing 14 by means of a threaded stud 60 which is permanently affixed to the inside wall 62 of the cover 19 and by means of a nut 64 which is threaded matedly to the open end of the stud 60. The inside face of the nut 64 is located against the outer wall of the retainer 58, thereby sealing the filter element 12. The nut 64 and the retainer 58 provide access to the filter element 12 during filter change.

A cover 66 is located on and extends over the upper lip 56 of the outer wall 28 of the housing 14 and preferably fits in a groove 68 located on the inside face near the outer edge of the cover 66 in order to provide a more efficient sealing means. An acorn nut 70 is matingly threaded onto the stud 60 in order to secure the cover 66. The acorn nut 70 and the cover 66 serve to both provide access to the filter element 12 during filter change and to seal the chamber between the filter element 12 and the outer wall 28 of the housing 14 from the environment.

This filtration system 10 may provide fluid flow and filtration through one of two directions. In the first flow direction fluid enters the filtration system through the second port 32 and into the opening of the center tube 20 near the closed end 16 of the housing 14. The fluid in the internal area of the center tube 20 escapes the center tube 20 through the apertures 22 in the tube 20. The fluid then meets with the filter media 44 in the filter element 12 where the contamination within the fluid is separated from the fluid. The filtered fluid then escapes outward from the filter element 12 into the area between the filter element 12 and the wall 28 of the housing 14. The fluid then flows downward to the canted oval-shaped plate 24 where it is stopped and diverted around the closed bottom end of the center tube 20 and into the first port 29. The liquid then leaves the filtration system 10 through the first opening 26.

In a second and preferred flow direction the fluid enters the filtration system 10 through the first port 29. The liquid is then prevented from flowing directly to the second port 32 by the canted oval-shaped plate 24, the closed lower area of the center tube 20 and the circular plate 36. The fluid must then travel upward between the wall 28 of the housing 14 and the filter element 12. When the liquid reaches the top of the housing 14 it is sealed by the cover 66 and the retainer 58. The fluid travels into the filter element 12 along its length where the filter media 44 removes the contamination from the fluid and the filtered liquid exits the filter element at the inside of the filter element 12 and then enters the inside of the center tube 20 through the apertures 22. The fluid then flows downward through the central opening of the center tube 22 between the stud 60 and the wall 40 of the center tube 20. The fluid then escapes through the open bottom of the center tube 20 and is permitted to travel along the canted oval-shaped plate 24 to the second port 32 and out of the filtration system 10.

The above-described filtration system 10 provides a large number of desirable features.

First the use of a canted oval-shaped plate 24 between the center tube 20 and the housing 14 permit a virtual in line, or collinear location of the first opening 26 and the second opening 32. This in line feature greatly simplifies plumbing installations and provides a more ready access to the filtration system 10 to ease filter element 12 changes.

Secondly, the use of a center tube 20 that is integral to the housing 14 permits the use of a disposable filter element 12 which is much simpler, inexpensive and easier to dispose of. Not only is a filter element 12 without a center tube 20 less expensive, it is also much easier to dispose of, particularly considering the biodegradable nature of the paper used as a filter media 44.

The use of a reservoir 50 with a drain outlet 52 provides for a neat, orderly, and simple means of containing the fluid that escapes the filtration system 10 during the change of the filter element 12. The drain outlet 52 may be connected to a central collecting area for this particular material in order that it be properly disposed.

In conclusion this filtration system 10 provides for inline filtration system installation which is simpler and less expensive than other types of configurations, a simple, less expensive and easier to dispose filter element 12 without a metal center tube, and a reservoir 50 with a draining feature in order to contain the fluid that escapes during filtration change.

Still other aspects, objects and advantages of the present invention can be obtained from a study of the specification, drawings and the appended claims.

We claim:

1. A filtration system for use to separate contamination from a fluid comprising:
   an elongate tubular housing having a closed end and an open end;
   an elongate perforated tubular member having apertures, said member encapsulated within said housing;
   a separating means for prohibiting flow between said housing and said tubular member located near said closed end of said housing;
   a first fluid opening in said housing located between said separating means and said open end;
   a second fluid opening in said housing located between said separating means and said open end;
   a filter element located between said housing and said member; and
   a cover located on said open end of said housing whereby fluid is contained within said housing;
   a reservoir located at said open end of said housing whereby liquid escaping from said housing may be contained; and
   said reservoir opening upwardly and extending at least partially about said open end and being positioned to contain fluid escaping from the filtration system during change of said filter element.

2. A filtration system for use to separate contamination from a fluid comprising:
   an elongated tubular housing having a closed end and an open end;
   an elongate perforated tubular member having apertures, said member encapsulated within said housing;
   a separating means for prohibiting flow between said housing and said tubular member located near said closed end of said housing;
   a first fluid opening in said housing located between said separating means and said open end;
   a second fluid opening in said housing located between said separating means and said open end;
   said first and second opening being substantially collinear;
   a filter element located between said housing and said member;
   a cover located on said open end of said housing whereby fluid is contained within said housing; and
   a reservoir located at said open end of said housing whereby liquid escaping from said housing may be contained.

3. The filter of claim 1 wherein said filter element comprises a hollow cylindrical filter media contained at one end by a lower cap and at a second end by an upper cap.

4. The filter of claim 1 wherein said perforate tubular member is centrally located within said housing.

5. The filter of claim 1 wherein said reservoir has a draining means.

6. The filter of claim 1 wherein said filter is secured by a retainer fitting over said filter on said open end of said housing, said retainer secured by a nut and threaded stud extending from said closed end of said housing.

7. A cylindrical replaceable element filtration system for use to separate contamination from a fluid comprising;
   an elongate tubular housing having a closed end and an open end;
   an elongate perforated center tube centrally located within said housing;
   a canted oval shaped plate located between said housing and said tube whereby flow between said housing and said tube is blocked;
   a first tubular opening in said housing located between said canted plate and said open end;
   a second tubular opening in said housing located between said canted plate and said closed end;
   a filter element located between said housing and said member;
   a cover located on said open end of said housing whereby fluid is contained within said housing; and
   a cup shaped reservoir located at said open end of said housing whereby liquid escaping from said housing may be contained.

8. The filter of claim 7 wherein said filter element comprises a hollow cylindrical filter media contained at one end by a lower cap and at a second end by an upper cap.

9. The filter of claim 7 wherein said reservoir has a drain means.

10. The filter of claim 7 wherein said filter is secured by a retainer fitting over said filter on said open end of said housing, said retainer secured by a nut and threaded stud extending from said closed end of said housing.

11. A cylindrical replaceable element filtration system for use to separate contamination from a fluid comprising;
    an elongate tubular housing having a closed end and an open end;
    an elongate perforated center tube centrally located within said housing;
    a canted oval shaped plate located between said housing and said tube whereby flow between said housing and said tube is blocked;
    a first tubular opening in said housing located between said canted plate and said open end;
    a second tubular opening in said housing located between said canted plate and said closed end;
    a filter element located between said housing and said member;
    a stop within said housing to axially locate said filter element;
    a retainer fitting over said filter element on open end of said housing, whereby area within said filter element is sealed; and
    a cover located on said open end of said housing whereby fluid is contained within said housing.

12. The filter of claim 11 wherein said filter element comprises a recess on one end for receiving said center tube and filter media formed into a hollow cylindrical shape contained at one end by a lower cap and at a second end by an upper cap.

13. The filter of claim 11 wherein said retainer is secured by a nut and threaded stud extending from said closed end of said housing.

14. The filter of claim 11 wherein said first and second openings are substantially collinear.

15. The filter of claim 11 wherein said canted oval shaped plate is welded to said center tube and to said housing cylinder.

16. The filter of claim 11 wherein said stop is a circular plate welded to said center tube.

17. A cylindrical replaceable element filtration system for use to separate contamination from a fluid comprising;

an elongate tubular housing having a closed end and an open end;

an elongate perforated center tube centrally located within said housing;

a canted oval shaped plate located between said housing and said tube whereby flow between said housing and said tube is blocked;

a first tubular opening in said housing located between said canted plate and said open end;

a second tubular opening in said housing located between said canted plate and said closed end;

a filter element located between said housing and said tube, said filter element having a recess on one end to receive said center tube and comprising a hollow cylindrical filter media contained at one end by a lower cap and at a second end by an upper cap;

a stop affixed to the center tube to axially locate said filter element;

a cup shaped reservoir located at said open end of said housing whereby liquid escaping from said housing may be contained, said reservoir having an outlet at a bottom of said reservoir to provide drainage for said reservoir;

a retainer fitting over said filter on said open end of said housing, said retainer secured by a nut and threaded stud extending from said closed end of said housing whereby said filter is secured in said housing and whereby access to said filter is provided; and a cover located on and extending over said open end of said housing above said retainer whereby fluid is contained within said housing.

18. The filter of claim 17 wherein said first and second openings are substantially collinear.

19. The filter of claim 17 wherein said canted oval shaped plate is welded to said center tube and to said housing cylinder.

20. The filter of claim 17 wherein said stop is a circular plate welded to said center tube.

* * * * *